US012264205B2

(12) United States Patent
Quettier et al.

(10) Patent No.: US 12,264,205 B2
(45) Date of Patent: Apr. 1, 2025

(54) METHOD FOR PREPARING A HEAT-MODIFIED STARCH

(71) Applicant: ROQUETTE FRERES, Lestrem (FR)

(72) Inventors: Claude Quettier, Lambersart (FR); Vincent Wiatz, Premesques (FR); Solène Bock, Lambersart (FR); Jacques Legrand, Verquin (FR)

(73) Assignee: Roquette Freres, Lestrem (FR)

( * ) Notice: Subject to any disclaimer, the term of this patent is extended or adjusted under 35 U.S.C. 154(b) by 782 days.

(21) Appl. No.: 17/310,786

(22) PCT Filed: Feb. 26, 2020

(86) PCT No.: PCT/FR2020/050380
§ 371 (c)(1),
(2) Date: Aug. 24, 2021

(87) PCT Pub. No.: WO2020/174189
PCT Pub. Date: Sep. 3, 2020

(65) Prior Publication Data
US 2022/0127383 A1   Apr. 28, 2022

(30) Foreign Application Priority Data

Feb. 27, 2019 (FR) .................... 19 02016
Jun. 18, 2019 (FR) .................... 19 06521
Jul. 18, 2019 (FR) .................... 19 08132

(51) Int. Cl.
| | |
|---|---|
| *A23L 29/212* | (2016.01) |
| *A23L 29/30* | (2016.01) |
| *A23P 20/10* | (2016.01) |
| *C08B 30/04* | (2006.01) |
| *C08B 30/06* | (2006.01) |

(52) U.S. Cl.
CPC ............ *C08B 30/06* (2013.01); *A23L 29/212* (2016.08); *A23L 29/30* (2016.08); *A23P 20/10* (2016.08); *C08B 30/044* (2013.01)

(58) Field of Classification Search
None
See application file for complete search history.

(56) References Cited

U.S. PATENT DOCUMENTS

| | | |
|---|---|---|
| 6,221,420 B1 | 4/2001 | Thomas et al. |
| 10,676,540 B2 | 6/2020 | Vezzani |
| 2001/0017133 A1 | 8/2001 | Chiu et al. |
| 2019/0002593 A1* | 1/2019 | Vezzani ............... B01J 19/1812 |

FOREIGN PATENT DOCUMENTS

| | | |
|---|---|---|
| EP | 1557093 A1 | 7/2005 |
| WO | 9603891 A1 | 2/1996 |
| WO | 9603892 A1 | 2/1996 |
| WO | 2014042537 A1 | 3/2014 |

OTHER PUBLICATIONS

The English translation of the Chinese Office Action, mailed on May 20, 2023, in the related Chinese Appl. No. 202080015910.0.
Zhang Tianxue, "Influence of heat treatment on the structure and properties of highland barley starch", Engineering Science and Technology I, China Doctoral Dissertations & Master's Theses, Full-text Database (Master), [2017] No. 02, pp. B024-B788, Feb. 15, 2017.
The English translation of the Chinese search report, mailed on Aug. 19, 2022, in the related Chinese Appl. No. 202080015910.0.
Zhao et al., "Technical Research on Cultural Relics of the Capital Museum," the first edition, Beijing Yanshan Publishing House, pp. 372-374, Dec. 31, 2012. (Machine-generated translation).

* cited by examiner

*Primary Examiner* — Lien T Tran

(57) ABSTRACT

The invention relates to a method for producing a heat-modified starch, comprising the steps consisting in: (i) preparing a starch milk having a solids content of between 30 and 40%, preferably between 35 and 37% by weight, (ii) adding a solution of an alkaline agent at a weight concentration of between 25 and 35%, preferably of 30%, so as to obtain a conductivity on the milk of between 4 and 7 mS/cm, (iii) ensuring a contact time of between 0.5 and 2 hours, (iv) filtering and drying the starch milk such that the conductivity of the dried starch resuspended at 20% by weight of solids is between 0.7 and 2.5 mS/cm, (v) heating said dried starch so as to bring it to a temperature of more than 180° C. for a residence time of between 10 and 40 minutes, even more preferentially between 15 and 35 minutes.

9 Claims, No Drawings

METHOD FOR PREPARING A HEAT-MODIFIED STARCH

The invention relates to the production of heat-modified starch, which starch has stabilized viscosity following this heat treatment. Such heat-modified starches can then be used as texturizing and thickening agents in numerous food applications, in particular in soups, sauces, in desserts such as yogurts, stirred fermented milks, thermized yogurts, dessert creams, but also beverages, ready meals, and preparations based on meat or fish, such as surimi.

The invention also relates to the use of these heat-modified starches in combination with dextrins, as a glazing agent for preparing a transparent coating for vegetables (potato fries), meat products, or even pizza doughs, donuts or pie bases, snacks, croquettes, cereals or crumb-coating agents.

FIELD OF THE INVENTION

Synthesized biochemically, a source of carbohydrates, starch is one of the most widespread organic materials in the plant kingdom, where it constitutes organisms' nutrient reserves.

Starches have always been used in the food industry, not only as a nutritional ingredient but also for their technical properties, as a thickening agent, binder, stabilizer or gelling agent.

For example, native starches are used in preparations requiring cooking. Corn starch, in particular, forms the basis of "powders for flan".

Since it is rich in amylose, it retrogrades and therefore gels strongly. It makes it possible to obtain firm flans after cooking and cooling. It is also suitable for custards.

However, those cannot be used in pastries intended to be frozen since, on defrosting, the phenomenon of syneresis, which is reflected in the expulsion of water, destroys the texture of the custard.

Thus, in its native state, starch has limited applicability due to syneresis, but also due to:
  its low resistance to shear stresses and to heat treatments,
  its limited processability, and
  its low solubility in common organic solvents.

Thus, in order to meet today's demanding technical requirements, the properties of starch have to be optimized by various methods known as "modification".

These main modifications therefore aim to adapt the starch to the technical constraints resulting from cooking, but also from freezing/thawing, from appertization or sterilization, and to make it compatible with modern food (microwaves, instant meals, "high temperatures", etc.).

Starch modification therefore aims to correct one or more of the abovementioned defects, thereby improving its versatility and meeting the needs of consumers.

Techniques for modifying starch have generally been classified into four categories: physical, chemical, enzymatic and genetic, the ultimate goal being to produce various derivatives with optimized physicochemical properties.

Chemical and physical modifications are most commonly implemented.

Chemical treatment consists of introducing functional groups into the starch, which alters its physicochemical properties in a noteworthy manner. Indeed, such modifications of granular native starches profoundly alter their behavior in terms of gelatinization, bonding and retrogradation.

Generally, these modifications are made by chemical derivatization, such as esterification, etherification, crosslinking or grafting.

However, chemical modifications are less sought-after by consumers in food applications (also for environmental reasons), even if some modifications are considered to be safe.

Various physical modifications are thus proposed, for example:
  heat moisture treatment (HMT), consisting of treating the starch at controlled humidity levels (22-27%) and at high temperature, for 16 hours, in order to alter the structure and physicochemical properties of the starch;
  annealing, consisting of treating the starch in an excess of water at temperatures below the gelatinization temperature, in order to come close to the glass transition temperature;
  high-pressure processing (HPP), by means of which the amorphous regions of the starch granule are hydrated, leading to a distortion of the crystalline parts of the granule and promoting the accessibility of said crystalline regions to water;
  glow discharge plasma treatment, which generates, at ambient temperature, high-energy electrons and other highly active species. Applied to the starch, these active species excite the chemical groups in the starch and cause significant crosslinking of the macromolecules;
  osmotic pressure treatment (OPT), carried out in the presence of solutions with a high content of salts. The starch is suspended in sodium sulfate in order to produce a uniform suspension.
The starch goes from type B to type A after treatment, thereby acquiring a gelatinization temperature which increases significantly;
  "thermal inhibition" treatment. Generally, thermal inhibition means dehydrating a starch until it reaches the anhydrous or substantially anhydrous state (i.e. <1% humidity), then a heat treatment at more than 100° C. for a sufficient period of time to "inhibit" the starch, in this case to afford it properties of crosslinked starches. Moreover, it is necessary to place the starch under pH conditions which are at least neutral to preferentially alkaline, before carrying out the step of forced dehydration.

An alternative to "thermal inhibition" treatment has been proposed in the solvent phase and consists of heating a non-pre-gelatinized granular starch in an alcohol-based medium in the presence of a base and salts at a temperature of 120° to 200° C. for 5 minutes to 2 hours.

Regardless, the thermal inhibition process thus leads to obtaining a starch paste having properties of increased resistance to viscosity breakdown, and a non-cohesive texture.

The technical field to which the invention belongs is that of thermal inhibition treatment of starch without an aqueous-alcoholic solvent.

In this particular technical field, mention may more particularly be made of U.S. Pat. No. 6,221,420, which describes a thermally inhibited starch obtained by dehydration then heat treatment.

The main steps are:
  dehydration of the starch to a water content of less than 1%, carried out at a temperature of between 100 and 125° C., then
  heat treatment of the dry starch thus obtained, at approximately 140° C., in a reactive fluidized bed, for a duration of the order of 20 hours.

Preferentially, before the step of dehydrating the starch, it is recommended to perform a step of alkalinization of the starch, making it possible to bring the pH of the starch suspension to a value of between 7 and 10, preferably of between 8 and 10.

At this stage, before the step of dehydration proper which precedes the inhibition step, the water content of the starch (as demonstrated by way of examples) is then between 8 and 10%.

US 2001/0017133 describes a similar method, in which the starch is also dehydrated below 125° C. before the inhibition process is begun (at a temperature of more than 100° C., preferentially of between 120 and 180° C., more preferentially of between 140 and 160° C.) for a duration of up to 20 hours, preferentially of between 3 hours 30 and 4 hours 30.

Before the dehydration step, the conventional alkalinization step leads to a starch suspension having a pH value of between 7.5 and 11.2, preferably of between 8 and 9.5%, and a water content of between 2 and 15%.

A variant was proposed in patent application WO 2014/042537, which variant relates to heating an alkaline starch at temperatures of between 140 and 190° C. while ensuring that the inhibition method is initiated and carried out in the presence of a sufficient amount of water, that is more than 1% water.

In other words, this method recommends the thermal inhibition of a starch which has been alkalinized beforehand without carrying out a dehydration step.

The starch preparation or the starch is thus brought to a pH of between 9.1 and 11.2, preferentially to a value of the order of 10, and the humidity is adjusted to between 2 and 22%, preferentially between 5 and 10%.

The thermal inhibition is subsequently carried out directly on this powder or this starch, at a temperature of between 140 and 190° C., preferentially between 140 and 180° C., for a duration of 30 minutes.

From the foregoing, it is noted that the methods for thermal inhibition implemented in order to stabilize the viscosity of starches employ methods requiring:
  long treatment durations, i.e. up to 20 hours, and
  controlling the water content of the starches to be treated, based on the methods proposed in the prior art, whether to values of less than 1% or alternatively of between 2 and 22%.

There is therefore a need for a novel method for inhibiting starch, making it possible to further reduce the reaction time and without it being necessary to control the water content of the starch to be "thermally inhibited".

DESCRIPTION OF THE INVENTION

Thus, the invention relates to a method for producing a heat-modified starch, from a starch milk, comprising the steps consisting of:
  (i) preparing a starch milk having a solids content of between 30 and 40%, preferably between 35 and 37% by weight,
  (ii) adding a solution of an alkaline agent at a weight concentration of between 25 and 35%, preferably of 30% so as to obtain a conductivity on the milk of between 4 and 7 mS/cm,
  (iii) ensuring a contact time of between 0.5 and 2 hours,
  (iv) filtering and drying the starch milk such that the conductivity of the dried starch resuspended at 20% of solids is between 0.7 and 2.5 mS/cm,
  (v) heating said dried starch so as to bring it to a temperature of more than 180° C. for a residence time of between 10 and 40 minutes, even more preferentially between 15 and 35 minutes.

The starch to be used in the method of the invention may be of any origin, for example corn, waxy corn, amylomaize, wheat, waxy wheat, leguminous plants such as pea and faba bean, potato, waxy potato, tapioca, waxy tapioca, rice, konjac, etc.

"Faba bean" is intended to mean the group of annual plants of the species *Vicia faba*, belonging to the group of leguminous plants of the family Fabaceae, subfamily Faboideae, tribe Fabeae. A distinction is made between Minor and Major varieties. In the present invention, wild-type varieties and those obtained by genetic engineering or varietal selection are all excellent sources.

Preferentially, corn starch will be chosen, more particularly waxy corn starch (with a high amylopectin content), potato starch, cassava, pea and faba bean, as will be demonstrated by way of examples below.

The alkaline agent is preferentially selected from the group consisting of sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, taken alone or in combination, even more preferentially sodium carbonate.

The method in accordance with the invention first of all requires preparing a starch milk having a solids content of between 30 and 40%, preferably between 35 and 37% by weight. As will be demonstrated by way of examples below, the solids content is fixed at 36.5% by weight.

The next step then consists in controlling the alkaline impregnation of the starch by adding the alkaline agent in the form of a solution at a weight concentration of between 25 and 35%, preferably of 30%, in order to obtain a conductivity, on the milk, of between 4 and 7 mS/cm.

Indeed, the Applicant company has found that:
  the addition of the alkaline agent, more particularly the sodium carbonate, directly on the starch in the milk phase makes it possible to more effectively reach the sought-after high pH values (that is between 10.2 and 10.8, preferably of between 10.5 and 10.65) than spraying the starch in the dry phase with sodium carbonate, in the sense that the addition in the milk phase enables better migration of the carbonate within the starch granules compared to powder impregnation.
  Moreover, since impregnation in the powder phase requires adjusting the moisture content of the starch to high values, part of the energy intended for treating the product will therefore be lost to ensure the evaporation of the residual water.
  the addition of the alkaline agent in solution from a solution containing a weight concentration of between 25 and 35%, preferably of 30%, enables total dissolution of the alkaline agent in the starch milk, a quicker and more precise pH adjustment, and makes it possible to prevent deposition of solid alkaline agent at the bottom of the dryer in the event of it not dissolving.

The most important technical effect here is bringing it to a contact time of between 0.5 and 2 hours.
  controlling the level of impregnation of the starch via conductivity measurements makes it possible to achieve the required precision for said high pH values.

The following step leads to filtering and drying the starch milk such that the conductivity of the dried starch resuspended at 20% of solids is between 0.7 and 2.5 mS/cm.

The final step consists of heating the dry starch obtained in this way so as to bring it to a temperature of more than 180° C. for a residence time of between 10 and 40 minutes, even more preferentially between 15 and 35 minutes.

The rise in temperature, during step (v), of the dry starch obtained in step (iv) is preferentially carried out in devices of the continuous turbo-dryer type, for which the setpoint temperature is set at more than 190° C., preferably between 195 and 240° C., and the delta T, defined as the temperature difference between the setpoint temperature and the temperature of the product at the outlet of the dryer, is between 15 and 25° C.

The invention also relates to a heat-modified starch capable of being obtained according to the method described above.

The heat-modified starches according to the invention will advantageously be used, based on their respective properties, as a thickening agent or texturizing agent in food applications, in particular in soups, sauces, beverages and ready meals, and in desserts such as yogurts and stirred fermented milks, and thermized yogurts.

Due to their texturizing and gelifying properties, they also have numerous applications in widely varying fields such as:
  acid soups and sauces (pasteurized and sterilized),
  pasta sauces containing meat juices,
  desserts such as yogurts, fruit preparations for yogurts, stirred fermented milks, thermized yogurts, dessert creams,
  mayonnaise and hot vinaigrette,
  pie filling, fruit or meat filling or stable meat filling, either sweet or savory, dinners (short-life ready meals),
  pudding (dry mix to be cooked),
  baby food/preparations for infants,
  beverages,
  ready meals, preparations based on meat or fish, such as surimi.
  animal feed
  preparation of transparent coating of vegetables, for example potato fries, meat products, or even pizza doughs, donuts or pie bases, snacks, croquettes, cereals or crumb-coating agents.

For the latter application, these coatings or clearcoatings are designed to improve the preservation and crispness of the fries after they are cooked.

Conventional coating recipes comprise a plurality of constituents more or less complex, in particular:
  a flour, in particular rice flour
  a chemically modified starch of highly-crosslinked phosphate starch type (crosslinker: sodium trimetaphosphate) having a degree of substitution of at most 0.4%
  a native starch
  a dextrin.

A recipe may be chosen such as that proposed by the Applicant company in their patent EP 1,557,093, in which these components, chemically modified starch, native starch and dextrin, are derived from leguminous plants, in particular from peas.

The invention will be better understood with the aid of the following examples, which are intended to be illustrative and non-limiting.

Materials and Methods

Measurement of Conductivity

The method implemented here is adapted from the European Pharmacopoeia—current official edition—Conductivity (§ 2.2.38).

Materials:
KNICK 703 electronic conductivity meter, also equipped with its measuring cell and verified according to the procedure described in its instruction manual.

Procedure:
A solution containing 20 g of sample in powder form and 80 g of distilled water having a resistivity of greater than 500,000 ohms·cm is prepared.

The measurement is carried out at 20° C. using the conductivity meter, referring to the procedure indicated in the instrument's user manual.

The values are expressed in microSiemens/cm (µS/cm) or milliSiemens/cm (mS/cm).

Measuring the Viscosity of a Starch Suspension Using the Rapid Viscometer Analyzer (RVA)

This measurement is carried out at acid pH (between 2.5 and 3.5) under determined concentration conditions and according to a suitable temperature/time analysis profile.

Two buffer solutions are prepared:

Buffer A

The following are added to a 1 liter beaker containing 500 mL of demineralized water
  91.0 g of citric acid monohydrate (purity>99.5%), and homogenization is carried out,
  33.0 g of sodium chloride (purity>99.5%), and homogenization is carried out until complete dissolution,
  300.0 g of 1 N sodium hydroxide.

The contents are decanted into a 1 L volumetric flask and demineralized water is added to reach 1 L.

Buffer B 100 g of buffer A are mixed with 334.0 g of demineralized water.

The product to be analyzed is prepared in the following manner:

A mass of 1.37 g of the dry product to be analyzed, obtained in this way, is directly introduced into the receptacle of the viscometer, and buffer solution B is introduced until a mass equal to 28.00±0.01 g is obtained. Homogenization is carried out using the stirrer blade of the Rapid Visco Analyzer (RVA—NewPort Scientific).

The time/temperature and speed analysis profile in the RVA is then carried out as follows:

TABLE 1

| Time hh:mm:ss | Temperature ° C. | Speed of rotation (RPM) |
| --- | --- | --- |
| 00:00:00 | 50 | 100 |
| 00:00:10 | 50 | 500 |
| 00:00:20 | 50 | 960 |
| 00:00:30 | 50 | 160 |
| 00:01:00 | 50 | 160 |
| 00:05:00 | 92 | 160 |
| 00:17:00 | 92 | 160 |
| 00:20:00 | 50 | 160 |

End of test: 00:20:05 (hh:mm:ss)
Initial temperature: 50° C.±0.5° C.
Data acquisition interval: 2 seconds
Sensitivity: low The results of the measurements are given in RVU (unit used to express the viscosity obtained on the RVA), it being known that 1 RVU unit=12 cPoises (cP).

As a reminder, 1 cP=1 mPa·s.

The results will therefore be presented in mPa·s.

The measurements will be of the viscosity taken "at the peak", i.e. the maximum viscosity value between 4 and 6 minutes, and "at the drop", i.e. the difference between the viscosity value at the peak and that measured at 17 minutes.

EXAMPLES

Example 1

Preparation of Heat-Modified Starches "A" from Waxy Corn Starch

1) The alkalinization of the waxy corn starch is carried out according to the following steps:
Prepare a waxy corn starch milk at 36.5% by weight of solids (S)
Prepare a solution of sodium carbonate at 30% weight concentration and heat to 40-50° C. to promote the dissolution of the carbonate;
Add the solution of sodium carbonate at 30% weight concentration so as to obtain a conductivity on the milk of between 4 and 7 mS/cm;
Ensure a contact time of 0.5 h;
Filter and dry the starch such that the final conductivity on the powder resuspended at 20% by weight of S is 1.9 mS/cm.

2) Heat Treatment
The product obtained in this way is heat treated in continuous turbo dryers of VOMM type in series, the setpoint temperature of which is set at 200° C. and which are configured to subject the product to a residence time of 20 min and such that the temperature difference between the setpoint and the temperature of the product at the outlet of the dryer, referred to as Delta T, is a value of approximately 17° C.
Process Parameters

TABLE 2

| Exp | Conductivity on product after impregnation, brought to 20% by weight of S, in mS/cm | Moisture content of the product after heat treatment, in % | Delta T | T° C. setpoint | Residence time (min) |
|---|---|---|---|---|---|
| A | 1.9 | 11.8 | 17 | 200 | 20 |

The RVA viscosity measurements are carried out and presented in the table below.
Results

TABLE 3

| Exp | Peak RVA (mPa · s) | Drop RVA (mPa · s) |
|---|---|---|
| A | 530 | 93 |

Example 2

Preparation of Heat-Modified Starches "C" from Waxy Corn Starch

1) The alkalinization of the waxy corn starch is carried out according to the following steps:
Prepare a waxy corn starch milk at 36.5% by weight of solids (S)
Prepare a solution of sodium carbonate at 30% weight concentration and heat to 40-50° C. to promote the dissolution of the carbonate;
Add the solution of sodium carbonate at 30% weight concentration so as to obtain a conductivity on the milk of between 4 and 7 mS/cm;
Ensure a contact time of 0.5 h;
Filter and dry the starch such that the final conductivity on the powder resuspended at 20% by weight of S is 1.4 mS/cm 2) Heat Treatment
The product obtained in this way is heat-treated in continuous turbo dryers of VOMM type in series, the setpoint temperature of which is set at 200° C. and which are configured to subject the product to a residence time of 25 min, and such that the temperature difference between the setpoint and the temperature of the product at the outlet of the dryer, referred to as Delta T, is a value of approximately 23° C.
Process Parameters

TABLE 4

| Exp | Conductivity on product after impregnation, brought to 20% by weight of S, in mS/cm | Moisture content of the product before heat treatment, in % | Delta T | T° C. setpoint | Residence time (min) |
|---|---|---|---|---|---|
| C | 1.4 | 11.6 | 23 | 200 | 25 |

The RVA viscosity measurements are carried out and presented in the table below.
Results

TABLE 5

| Exp | Peak RVA (mPa · s) | Drop RVA (mPa · s) |
|---|---|---|
| C | 914 | −70 |

Example 3

Preparation of Heat-Modified Starches "G" from Pea Starch

1) The alkalinization of the pea starch is carried out according to the following steps:
Prepare a pea starch milk at 33% by weight of solids (S)
Prepare a solution of sodium carbonate at 30% weight concentration and heat to 40-50° C. to promote the dissolution of the carbonate;
Add the solution of sodium carbonate at 30% weight concentration so as to obtain a conductivity on the milk of between 4 and 6 mS/cm;
Ensure a contact time of 0.5 h;
Filter and dry the starch such that the final conductivity on the powder resuspended at 20% by weight of S is 0.9 mS/cm 2) Heat Treatment
The product obtained in this way is heat-treated in continuous turbo dryers of VOMM type in series, the setpoint temperature of which is set at 200° C. and which are configured to subject the product to a residence time of 20 min and such that the temperature difference between the setpoint and the temperature of the product at the outlet of the dryer, referred to as Delta T, is a value of the order of 20° C.

Process Parameters

TABLE 6

| Exp | Conductivity on product after impregnation, brought to 20% by weight of S, in mS/cm | Moisture content of the product before heat treatment, in % | Delta T | T° C. setpoint | Residence time (min) |
|---|---|---|---|---|---|
| G | 0.9 | 10.5 | 20 | 200 | 20 |

The RVA viscosity measurements are carried out and presented in the table below.
Results

TABLE 7

| Exp | Peak RVA (mPa · s) | Drop RVA (mPa · s) |
|---|---|---|
| G | 60 | −132 |

Example 4

Preparation of Heat-Modified Starches "H-1" and "H-2" from Faba Bean Starch

1) The alkalinization of the faba bean starch is carried out according to the following steps:
Prepare a faba bean starch milk at 33% by weight of solids (S);
Prepare a solution of sodium carbonate at 30% weight concentration and heat to 40-50° C. to promote the dissolution of the carbonate;
Add the solution of sodium carbonate at 30% by weight of weight concentration to the starch milk, so as to obtain a conductivity on the milk of between 4 and 6 mS/cm;
Ensure a contact time of 0.5 h;
Filter and dry the starch such that the final conductivity on the powder resuspended at 20% by weight of S is between 1.5 and 2 mS 2) Heat Treatment The product obtained in this way is heat-treated in continuous turbo dryers of VOMM type in series, the setpoint temperature of which is set at 210° C. and which are configured to subject the product to a residence time of the order of 13-25 min and such that the temperature difference between the setpoint and the temperature of the product at the outlet of the dryer, referred to as Delta T, is a value of the order of 21-25° C.

Process Parameters

TABLE 8

| Exp | Conductivity on product after impregnation, resuspended at 20% by weight of S, in mS/cm | Moisture content of the product before heat treatment, in % | Delta T | T° C. setpoint | Residence time (min) |
|---|---|---|---|---|---|
| Faba bean starch base | 0.133 | 8 | 0 | 0 | 0 |
| H-1 | 1.9 | 14 | 24 | 210 | 13 |
| H-2 | 1.9 | 14 | 23.5 | 210 | 25 |

The RVA viscosity measurements are carried out and presented in the table below.
Results:

TABLE 9

| Tests | Drop RVA (mPa · s) | Peak RVA (mPa · s) |
|---|---|---|
| Faba bean starch base | 82 | 323 |
| H-1 | −79 | 229 |
| H-2 | −47 | 45 |

The heat-modified starches prepared from faba bean starch H-1 and H-2 have improved stability during the process of use compared to native starch: fewer phenomena of viscosity gain and retrogradation are observed during the use of these heat-modified starches.

Example 5

Preparation of Heat-Modified Starches "I-1" and "I-2" from Potato Starch

1) The alkalinization of the potato starch is carried out according to the following steps:
Prepare a potato starch milk at 36.5% by weight of solids (S)
Prepare a solution of sodium carbonate at 30% weight concentration so as to obtain a conductivity on the milk of between 4 and 7 mS/cm.
Ensure a contact time of 0.5 h
Filter and dry the potato starch such that the final conductivity on the powder resuspended at 20% by weight of S is 1.1 mS 2) Heat Treatment The product obtained in this way is heat-treated in continuous turbo dryers of VOMM type in series, the setpoint temperature of which is set at 210° C. and which are configured to subject the product to a residence time of the order of 30 to 48 min and such that the temperature difference between the setpoint and the temperature of the product at the outlet of the dryer, referred to as Delta T, is a value of approximately 19-21° C.

Process Parameters

TABLE 10

| Exp | Conductivity on product after impregnation, resuspended at 20% by weight of S, in mS/cm | Moisture content of the product before heat treatment, in % | Delta T | T° C. setpoint | Residence time (min) |
|---|---|---|---|---|---|
| Potato starch base | 0.15 | 16.8 | 0 | 0 | 0 |
| I-1 | 1.1 | 13 | 21 | 210 | 30 |
| I-2 | 1.1 | 13 | 19.5 | 210 | 48 |

The RVA viscosity measurements are carried out and presented in the table below.
Results:

TABLE 11

| Tests | Drop RVA (mPa · s) | Peak RVA (mPa · s) |
| --- | --- | --- |
| Potato starch base | 545 | 887 |
| I-1 | −270 | 583 |
| I-2 | −400 | 167 |

The heat-modified starches prepared from starch I-1 and I-2 have improved stability during the process of use compared to native potato starch: fewer phenomena of viscosity gain and retrogradation are observed during the use of these heat-modified starches.

Example 6

Preparation of Heat-Modified Starches "J-1" and "J-2" from Cassava Starch

1) The alkalinization of the cassava starch is carried out according to the following steps:
   Prepare a cassava starch milk at 36.5% by weight of solids (S)
   Prepare a solution of sodium carbonate at 30% weight concentration so as to obtain a conductivity on the milk of between 4 and 7 mS/cm.
   Ensure a contact time of 0.5 h
   Filter and dry the cassava starch such that the final conductivity on the powder resuspended at 20% by weight of S is 1 mS
2) Heat Treatment
   The product obtained in this way is heat-treated in continuous turbo dryers of VOMM type in series, the setpoint temperature of which is set at 210° C. and which are configured to subject the product to a residence time of approximately 20 to 35 min and such that the temperature difference between the setpoint and the temperature of the product at the outlet of the dryer, referred to as Delta T, is a value of the order of 22-27° C.

Process Parameters

TABLE 12

| Exp | Conductivity on product after impregnation, resuspended at 20% by weight of S, in mS/cm | Moisture content of the product before heat treatment, in % | Delta T | T° C. setpoint | Residence time (min) |
| --- | --- | --- | --- | --- | --- |
| Cassava starch basis | 0.10 | 14 | 0 | 0 | 0 |
| J-1 | 1 | 11 | 27 | 210 | 20 |
| J-2 | 1 | 11 | 22 | 210 | 35 |

The RVA viscosity measurements are carried out and presented in the table below.
Results:

TABLE 14

| Tests | Drop RVA (mPa · s) | Peak RVA (mPa · s) |
| --- | --- | --- |
| Cassava starch basis | 470 | 610 |
| J-1 | 10 | 350 |
| J-2 | −195 | 95 |

The heat-modified starches prepared from starch J-1 and J-2 have improved stability during the process of use compared to native cassava starch: fewer phenomena of viscosity gain and retrogradation are observed during the use of these heat-modified starches.

Example 7

Use of Heat-Modified Starches "G" and "1-2" as Clearcoating for Potato Fries

In order to have crispy and tasty products which stay hot longer, said products are glazed with a starch-based recipe.
The formula tested is as follows:

TABLE 15

| Ingredients | Amount (%) |
| --- | --- |
| Starch tested | 61.1 |
| TACKIDEX ® C760 (pea dextrin) sold by the Applicant company | 12 |
| ML 100 rice flour (Rickmers) | 20 |
| NaCl | 5 |
| Sodium bicarbonate | 0.9 |
| Disodium pyrophosphate | 0.9 |
| Xanthan gum F80 | 0.1 |

The starches tested are as follows:
Heat-modified starch "1-2" according to example 5
Heat-modified starch "G" according to example 3
Chemically stabilized, crosslinked pea starch, CLEARAM® LI 4000, sold by the Applicant company
Native potato starch
Diphosphate potato starch, PERFECTAMYL® FFC, from AVEBE
Native pea starch N-735, sold by the Applicant company
Commercially available thermally inhibited starch.
The process for preparing the clearcoating is as follows:
Preparation of the Batter
  Homogenization of the powders
  Mixing powder and water using a "Kitchen Aid" fitted with blade K, speed 1, for 10 min
  Dilution weight ratio (1/1.5)=1 part powder to 1.5 parts water (temperature 6-8° C.)
Coating of the Fries
  Drying blanched cut potatoes
  Glazing and draining
  The excess batter is removed using a blower
  Frying for 50 s at 180° C.
  Draining
  Deep-freezing for 1 h and storage at −18° C.
Final Frying
  Frying for 2 min 3 to 3 min 30 at 180° C.
The different clearcoated fries are evaluated using the following measurements:
1) Pick-Up
This measurement is part of the routine analyses performed on this type of application. It consists in evaluating the amount of batter set around the potato after glazing. The target value must be between 10 and 12%.

The % pick-up=(final weight of glazed substrate−initial weight of substrate)/final weight of glazed substrate 2) Viscosity Measurement This measurement is also part of the routinely-performed analyses. It consists in measuring the viscosity of the batter, the viscosity having a direct link to the pick-up. A thicker batter generally causes higher pick-up values.

This measurement is performed using a flow cup T828, diameter 4 mm, capacity 100 ml. The target value is about 54-55 s.

3) Measurement of Fats

Since the clearcoating has a direct impact on exchanges between the substrate and the oil, the measurements of fats and solids are indicative of the performance of the clearcoating. Two repeats are carried out 4) Measurement of Solids This measurement is performed using a Sartorius scale under atmospheric pressure (MA 40 moisture analyzer device).

5 Sensory Characterization

Sensory characterizations are subjective assessments, and comments in terms of appearance and texture (feel/mouth) were made with an internal panel, formed beforehand to assess the crispiness of the fries.

The results obtained show that replacing the chemically stabilized crosslinked pea starch with heat-modified starch in accordance with the invention leads to a clearcoating for fries which is remarkably equivalent.

The invention claimed is:

1. A method for producing a heat-modified starch, comprising the steps of:
   (i) preparing a starch milk having a solids content of between 30 and 40% by weight,
   (ii) adding a solution of an alkaline agent at a weight concentration of between 25 and 35%, so as to obtain a conductivity on the milk of between 4 and 7 mS/cm,
   (iii) ensuring a contact time of the starch milk with the alkaline agent of between 0.5 and 2 hours,
   (iv) filtering and drying the starch milk such that a conductivity of the dried starch resuspended at 20% by weight of solids is between 0.7 and 2.5 mS/cm,
   (v) heating said dried starch so as to bring it to a temperature of more than 180° C. for a residence time of between 10 and 40 minutes.

2. The method according to claim 1, wherein an origin of the starch is selected from the group consisting of corn, waxy corn, potato, cassava and leguminous plants.

3. The method according to claim 1, wherein the alkaline agent is selected from the group consisting of sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, taken alone or in combination.

4. The method according to claim 3, wherein a rise in temperature of the dry starch obtained in step (v) is carried out in devices of continuous turbodryer type, for which a setpoint temperature is set at more than 190° C., and a delta T, defined as the temperature difference between the setpoint temperature and a temperature of the product at the outlet of the dryer, is between 15 and 25° C.

5. The method according to claim 1, wherein the starch milk has a solids content of between 35 and 37% by weight.

6. The method according to claim 1, wherein the solution of the alkaline agent has a weight concentration of 30%.

7. The method according to claim 2, wherein the origin of the starch is waxy corn, pea or faba bean.

8. The method according to claim 3, wherein the alkaline agent is sodium carbonate.

9. The method according to claim 4, wherein the setpoint temperature is between 195 and 240° C.

* * * * *